June 16, 1964 G. T. RANDOL 3,137,361
POWER CYLINDER ADAPTED FOR BRAKE BOOSTER MOTOR USE
Original Filed Jan. 21, 1958
3 Sheets-Sheet 2
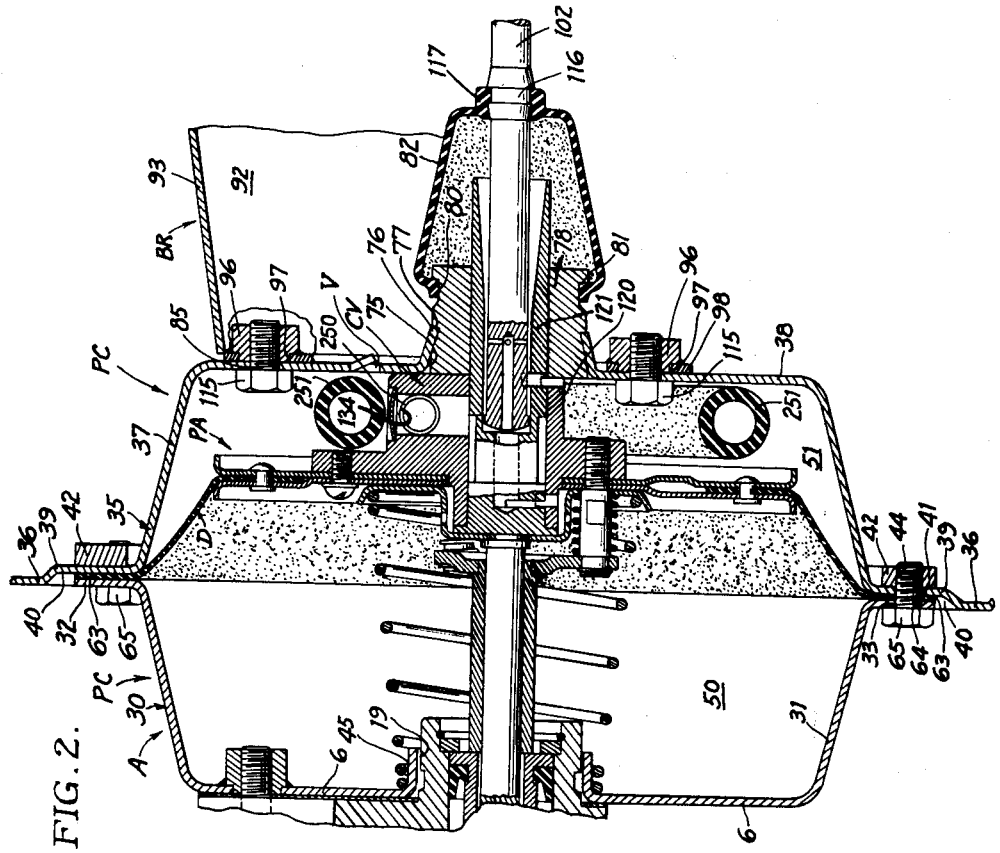
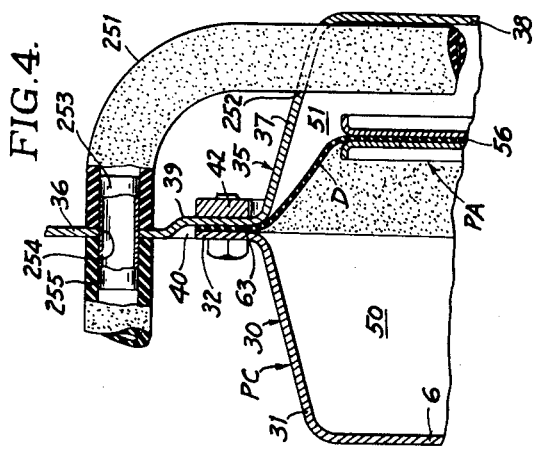
Inventor

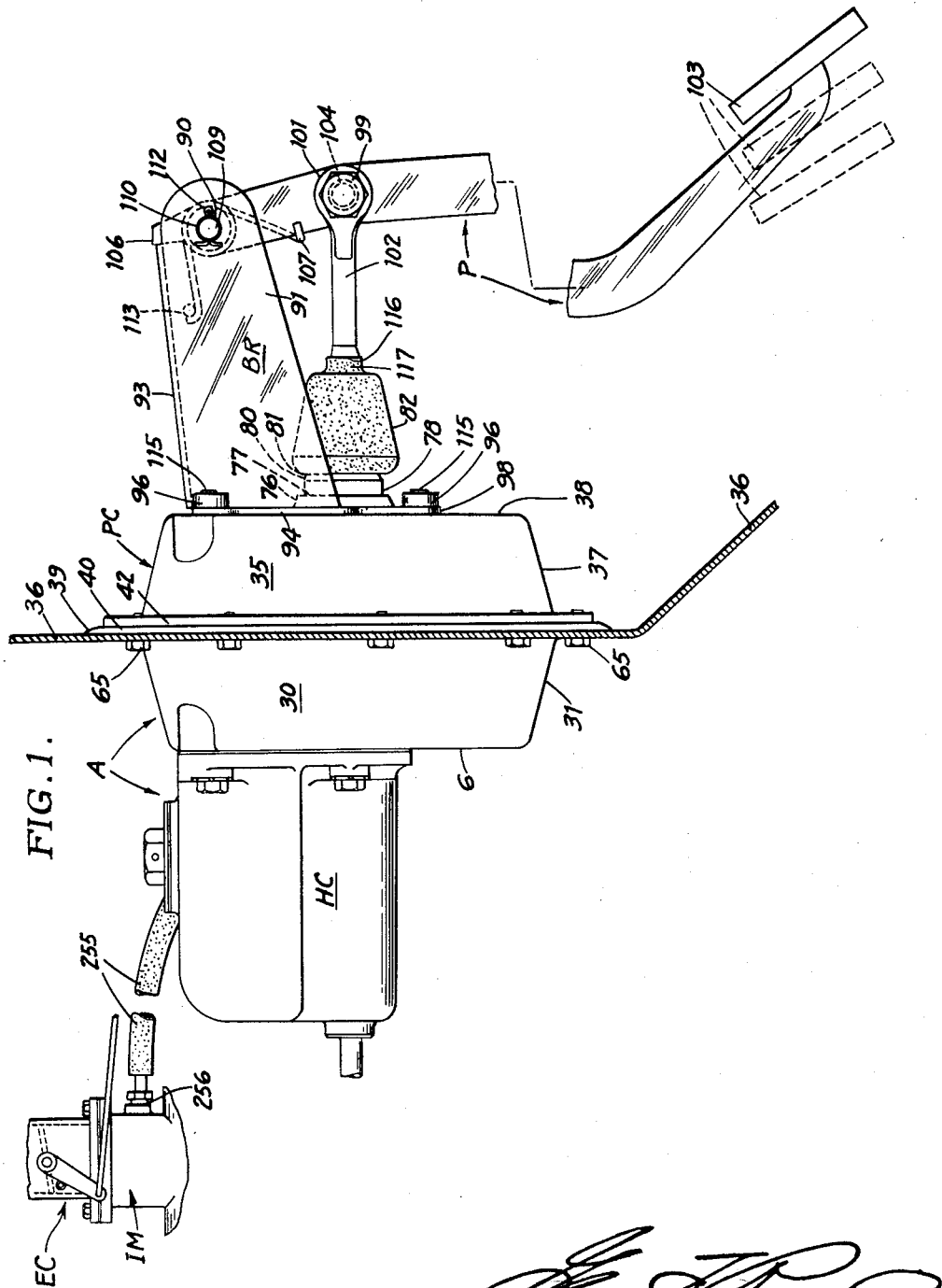

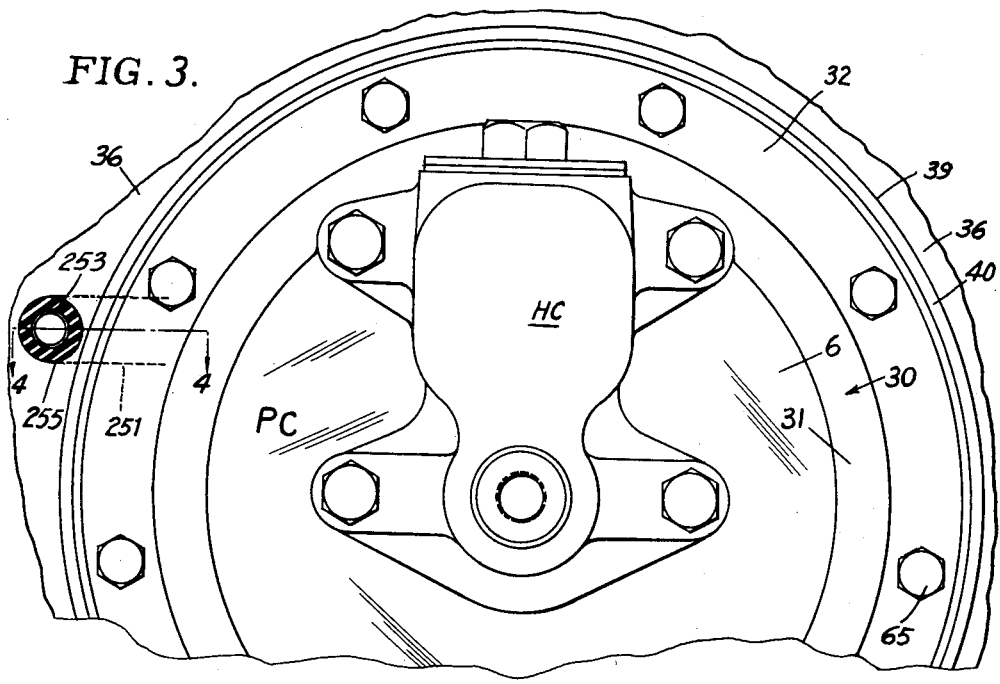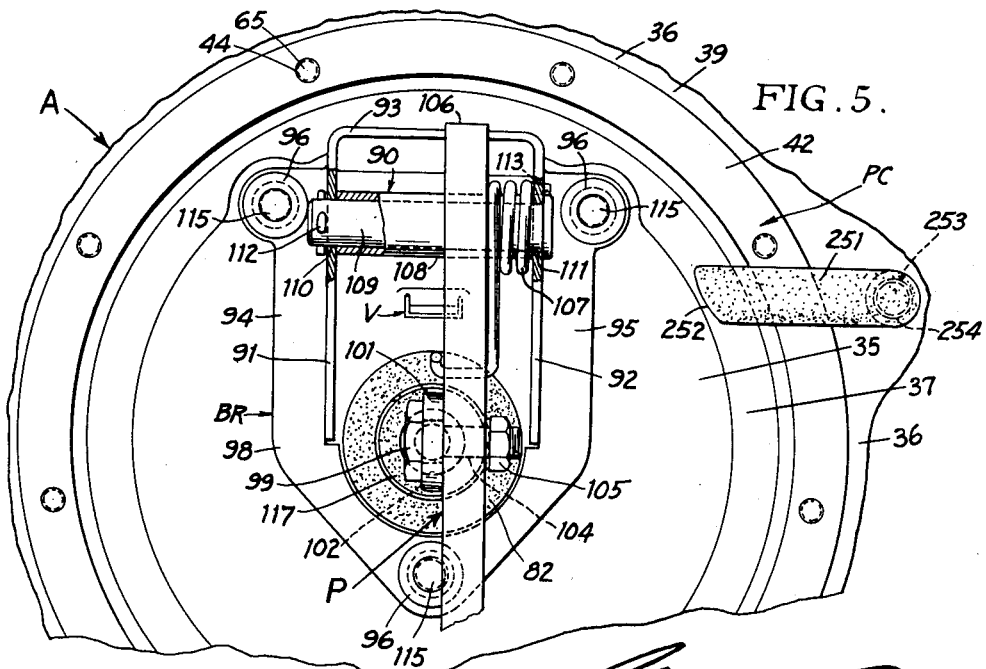

United States Patent Office 3,137,361
Patented June 16, 1964

3,137,361
POWER CYLINDER ADAPTED FOR BRAKE BOOSTER MOTOR USE
Glenn T. Randol, 2nd Ave. and Paull St., P.O. Box 275, Mountain Lake Park, Md.
Original application Jan. 21, 1958, Ser. No. 710,303, now Patent No. 3,040,535, dated June 26, 1962. Divided and this application June 25, 1962, Ser. No. 204,916
7 Claims. (Cl. 180—77)

This application is a division of my copending application Serial No. 710,303 filed January 21, 1958, now issued to Patent No. 3,040,535 dated June 26, 1962.

The invention relates generally to walled enclosures, and more particularly to a novel and improved fluid chamber enclosure adapted to house the operating mechanism of pressure differential operated motors and the like such as, for example, the booster-type motor employed on motor vehicles to actuate in part the master cylinder in the hydraulic brake system.

In my copending application above referred to, I have disclosed a novel pressure differential operated brake booster motor having a power cylinder of improved and patentable construction. The prior art is replete with two-sectioned power cylinders mounted in operating position on the engine side of the vehicle firewall by an interposed bracket member. Use of such a bracket introduces considerable overhang of the assembly from the firewall characterized by angular deflection of that portion of the asesmbly remote from the firewall when actuating force is applied to the operating mechanism contained within the power cylinder, especially during a "straight-through" operation of the master cylinder in cooperation with or independently of the booster unit.

Workers in the art have heretofore proposed various methods of attaching the power cylinder of such booster motors directly or indirectly to the engine side of the firewall, but none has produced a two-sectioned power cylinder wherein one of the sections is formed by impressing a circular concavity in the vehicle firewall and to associate with said concavity a detachable cup-shaped member having a complemental cavity to produce a power cylinder adaptable to a wide range of booster motors of the general character disclosed in my copending application. Therefore, there are certain features of construction and use which relate particularly to the power cylinder per se, thus rendering the same applicable for housing the working parts of booster motors other than the novel combination and arrangement disclosed in my parent application. These features of the power cylinder form the subject-matter of the present application.

Therefore, the primary object of my invention seeks to overcome the above noted disadvantages by integrating a portion of the cylinder with a component of the vehicle, such as, for example, the firewall panel, to produce an extremely compact booster brake assembly characterized by minimal overhang from the firewall panel therefore requiring less space than normal for installation and contributing to a more rigid assembly free of angular deflection when subjected to actuating thrusts imparted separately or jointly by pressure differential and the operator, and wherein the construction of the cylinder is simple and economical to produce and readily assembled and disassembled.

More specifically, my invention provides a novel and improved power cylinder casing composed of two principal sections, one of which is an integral part of the vehicle firewall panel and the other section being attachable to the firewall panel to produce a fluid chamber enclosure having a movable wall therein which divides said chamber into opposing fluid pressure chambers. Partial integration of the power cylinder with the vehicle firewall reduces installation space for the booster apparatus as well as eliminates a separate mounting bracket therefor. In present-day motor vehicles, the lowering of the hood line and the use of various power accessories operated from the engine, such as, for example, the pump for the hydraulic-power steering and reservoir therefor, water reservoir for cleaning the windshield, air conditioning pump and other components, has placed a premium on space in the engine compartment, especially for mounting a brake booster motor on the firewall in coaxial relationship to the master cylinder operated in part thereby. Under such conditions, a further object of the invention is to form a portion of the forward side of the firewall panel with a concavity of substantially cup-shaped configuration, the peripheral marginal portion of the open end thereof being provided with a plurality of circumferentially spaced threaded holes. A detachable complemental cup-shaped casing is provided at its open end with a peripheral outturned flange having holes which register with the threaded holes aforesaid. Inserted between said marginal portion and said flange, is the peripheral marginal portion of a flexible power-diaphragm having holes which register with the concavity marginal and flange holes, whereby fasteners, such as the illustrated cap bolts inserted through the registering holes into threaded engagement with the threaded holes clamp the outer marginal portions of the cup-shaped casing and diaphragm in an airtight unitary assembly with respect to the concavity in the firewall to produce the present novel power cylinder in which the power-diaphragm divides the interior thereof, for example, into an air chamber continuously vented to atmosphere, and a vacuum-power chamber selectively connectible to vacuum and atmosphere for power-activation and inactivation respectively of the booster motor. With this novel arrangement, the overall length of the booster apparatus is appreciably reduced and the assembly thereof on the vehicle in operating position more rigidly integrated with the vehicle structure proper. In this way, the air chamber of the booster motor is disposed in the firewall panel within the driver's compartment while the vacuum-power chamber is provided within the detachable casing on the engine side of the firewall to produce an extremely compact power-assist unit in hydraulic brake systems.

An object closely related to the objects immediately preceding is the provision of novel vacuum conduit connections between the said novel power cylinder and engine inlet-manifold, the latter serving exemplarily as the source of vacuum, and which comprise a rigid tubular fitting projecting through a hole in the firewall adjacent the periphery of the concavity aforesaid, a flexible conduit having one end attached to that portion of the fitting projecting into the driver's compartment, and the other end of the conduit is inserted through a hole in the cylindrical walled portion of the concavity into substantially a convolution within said concavity. The end of the convolution is attached to a rigid tubular fitting mounted on and communicating with the control valve for the booster unit. The other end of the first-mentioned tubular fitting projects into the engine compartment and receives one end of another flexible conduit having its other end attached to a rigid tubular fitting in continuous communication with the interior of the engine inlet-manifold whereby the manifold vacuum production is conducted to the power control valve for the booster unit as is understood.

With these and other objects and advantages in view, the invention consists of the new and novel combination, construction, and arrangement of parts as hereinafter more fully described, set forth in the claims appended hereto, and disclosed in the accompanying drawings forming part hereof, wherein:

FIGURE 1 is a side elevation of my improved power cylinder constructed in accordance with the present invention, and exemplarily shown as a housing for the operating mechanism of a booster-type motor in operative association with the components of an automotive hydraulic brake system;

FIGURE 2 is a vertical longitudinal section of said power cylinder showing in detail the relationship between the two-sections thereof and the peripheral marginal portion of the power-diaphragm;

FIGURE 3 is a front elevation of the power cylinder showing in detail the detachable cup-shaped casing;

FIGURE 4 is a sectional view taken on the line 4—4 of FIGURE 3 to show details of the vacuum conduit construction where it passes through the vehicle firewall; and FIGURE 5 is a rear elevation of the concavity in the vehicle firewall which projects into the driver's compartment, and shows details of the marginal reinforcing ring into which a plurality of fasteners are threaded to produce a unitary and stabilized assembly of the power cylinder on the vehicle firewall.

Referring now to the drawings, there is shown in FIGURE 1 my novel fluid chamber enclosure disclosed herein as a power cylinder adapted to enclose and support the operating parts of a fluid-pressure operated motor generally designated "A," said power cylinder being designated as a whole "PC."

The power cylinder PC comprises: a forward detachable cup-shaped casing or shell 30 provided with an angular or tapered circular wall 31, an end wall 6, an outstanding annular flange 32 parallel to said end wall defines the open end of said casing, and a plurality of circumferentially spaced holes 33 through said flange. A complemental casing or shell 35 having a concavity similar to that of shell 30 is rearwardly impressed into a support member exemplarily shown as the vehicle firewall 36, and therefore forms an integral portion thereof, said shell 35 having a circular tapered wall 37, an end wall 38, and an offset 39 defines the open end thereof to provide an annular recessed portion 40 parallel to the end wall 38, and which registers with the flange 32 on the detachable shell 30. A corresponding number of circumferentially spaced holes 41 are provided in the recessed portion, and a reinforcing metallic ring 42 is secured as by welding or otherwise, to the rear face of this recessed portion, and provided with a like number of threaded holes 44 with similar spacing to that of the holes 33, 41 in the flange and recessed portion respectively. The central portion of the end wall 6 is provided with a circular opening 19 encircled by an integral inturned circular flange 45 to add rigidity to this portion of the end wall.

The peripheral portion of the power-diaphragm assembly "PA" is flexible, and disclosed herein as a diaphragm "D" preferably composed of rubber coated fabric. The outer peripheral marginal portion 63 of the diaphragm D is provided with a plurality of holes 64 which register with the holes 33, 41, 44 aforesaid, and is disposed between the confronting faces of the flange 32 and recessed portion 40. A corresponding number of fasteners, such as cap screws 65, for example, are inserted through the holes 33, 41, 64 into threaded engagement with the threaded holes 44 in the reinforcing ring 42 whereby compression is imposed on the outer marginal portion of the diaphragm D when the cap screws are drawn tightly to effect an airtight seal between the vacuum-power chamber 50 and the air chamber 51 and exterior of the power cylinder PC, best demonstrated in FIGURE 2. In this manner, the unitary assembly of the power cylinder PC is provided with the rear shell 35 thereof forming an integrated part of the vehicle firewall 36 as shown in FIGURES 1 and 2.

A central circular opening 75 is provided in the end wall 38 of the power cylinder casing 35 in coaxial disposition with respect to the forward opening 19 in the detachable shell 30. The marginal portion of the opening 75 is provided with an outturned circular flange 76 for radial closure inwardly into an external annular groove 77 formed in a bearing collar 78 to make the collar rigid with the end wall 38 and therefore the firewall 36. Another external annular channel 80 adjacent the outer end of the collar is spaced from the groove 77 for reception of a bead 81 forming the larger end of a flexible dust excluding boot 82 as shown in FIGURE 2.

A plurality of holes 85, preferably three in number, are provided in the end wall 38, the purpose of which will be explained later, and a vent "V" is provided through the wall 38 to maintain the chamber 51 at atmospheric pressure.

An operator-operated member such as, for example, the brake-pedal generally designated "P" is adapted to operate the follow-up power control valve designated as a whole "CV" for controlling operation of the power-diaphragm assembly PA as is understood, said control valve comprising a valve sleeve 120 and a telescopically-related inner valve piston 121. The upper end of the brake-pedal P is pivotally supported at 90 on a bracket designated "BR" of generally inverted U-shaped configuration in cross section and having a pair of spaced side walls 91, 92 interconnected by an upper wall 93, said side walls terminating at their forward ends into outturned lateral flanges 94, 95 respectively, each of which carries at its upper end a threaded collar 96 having its forward end reduced and pressfitted and/or welded into a hole 97 through the flange to provide a rigid assembly therebetween. A generally V-shaped web segment 98 connects the lower ends of the lateral flanges aforesaid, and adjacent the vertex thereof is a threaded collar similar to collars 96 made rigid with this segment in the same manner. The bracket is supported on the end wall 38 of the power cylinder shell 35 forwardly of the steering jacket (not shown) in the driver's compartment of the vehicle, and, at a point below the pivot 90, the pedal P is pivotally connected, as by means of a shouldered hex-headed pin 99 inserted through an eye rod end 101 forming the end of a thrust or push-type rod 102 to provide, for example, a 5 to 1 leverage ratio between the thrust connection aforesaid and a foot-pad 103 defining the lower terminus of the pedal P. The reduced threaded portion of the pin 99 projects through a hole 104 in the pedal and is fixed on the pedal by nut 105. The upper end of the pedal terminates in a projection 106 which is adapted to engage the rear edge of the upper wall 93 to establish the fully released or normal position of the pedal under influence of a torsional spring 107 carried on a tubular sleeve 108 rigid with the pedal and through which the pivotal connection 90 is formed with a headed cross pin 109 projecting through aligned openings 110, 111 in the side walls 91, 92 respectively of the bracket and the sleeve, said pin being prevented from axial displacement by a cotter pin 112. The torsional spring has one leg connected to the pedal, and the other leg anchored in a hole 113 through the side wall 92, all as shown in FIGURES 1 and 5. Cap screws 115 project through the previously mentioned holes 85 in the wall 38 into threaded engagement with the threaded collars 96 to rigidly mount the bracket BR on the firewall 36 as shown. Accordingly, the present invention is especially adapted for installation in motor vehicles equipped with present-day suspended pedal mechanism furnished as original equipment to operate firewall mounted master cylinders.

Forwardly spaced from the rod end 101, is an external annular groove 116 on the push rod 102 which receives a bead 117 forming the outer smaller end of the dust boot 82 whereby the operating parts projecting through the collar 78 are protected from dust, etc.

A rigid tubular fitting 250 has one end pressed into the control valve passageway 134 and its free end receives one end of substantially a convolution of flexible conduit or hose 251, and the other end of the hose projects through a hole 252 in the circular wall 37 of the power cylinder casing 35 integral with the vehicle firewall 36. The exterior portion of the hose 251 is bent in substantially a 90° curve with its end tightly pressed on one end of a straight rigid tubular fitting 253 which projects through a hole 254 in the firewall 36 adjacent the recessed portion 40, and pressed on the opposite end of fitting 253 is one end of another flexible conduit or hose 255, the other end of the latter hose being connected to a rigid tubular fitting 256 threadedly attached, for example, into the wall of the inlet-manifold base "IM" on which the engine carburetor is mounted, said fragmentary portion of the carburetor being generally designated "EC," thereby placing the interior of the inlet-manifold IM in continuous communication with the power control valve passage 134 best shown in FIGURES 1, 3, 4 and 5.

The ends of the conduits 251, 255 on opposite sides of the firewall (see FIGURE 4) are pressed into intimate contact with the firewall to stabilize the tubular fitting 253 interconnecting these ends, and thus provide a simple method of connecting the power control valve CV to the source of vacuum without disrupting the effectiveness of the firewall to prevent fumes, cold air, etc., from entering the driver's compartment.

It is further contemplated that filtering material may be associated with the vent V to silence the ingress of air into the air chamber 51 during a brake-releasing operation and to prevent foreign matter from involving the moving parts of the control valve mechanism CV as is understood.

The foregoing description of my improved power cylinder construction PC for encasing the working parts of booster-type pressure operated motors with the added advantages of requiring less installation space and eliminating the customary mounting bracket between the firewall and motor assembly, is believed to clearly explain the structure thereof and mode of assembly on the vehicle. A further salient feature of integrating the rear section 35 of the power cylinder with the vehicle firewall panel is the elimination of alignment problems of the operating parts comprising the booster motor between the brake-pedal and master cylinder HC mounted on the front end wall 6 of the forward section 30 of the power cylinder to prevent binding of the parts which would impede smooth operation and contribute excessive wear. Furthermore, the overall weight of the booster unit is reduced as compared to conventional assemblies serving this purpose, the unit is more compact and free of distortion, and easier assembled and disassembled for inspection and servicing as may be required. Thus, it should be appreciated that by forming one half of the power cylinder PC as an integrated portion of the vehicle firewall provides the advantages of reduced length, greater compactness, and therefore requires less space for installation and provides a more rigid assembly, free of distortion under severe pedal and/or power actuating forces, with the vehicle proper than booster units which require conventional mounting brackets at added cost for attaching such units to the vehicle firewall in conventional manner.

Referring to the reinforcing ring 42 which is included in the structure of the present invention to provide wall thickness sufficient for an effective threaded connection with the cap bolts 65, also serves the additional function of stabilizing the recessed walled portion 40 of the firewall 36 against warping under tension of said bolt when drawn tightly so that the seal at the outer marginal portion of the flexible power-diaphragm D will not be broken. However, it is contemplated that this ring may be eliminated and instead, each of the holes 41 in the recessed portion may be reinforced with a nut of suitable thickness welded or otherwise attached to the recessed portion so that ample threaded connection is provided for the cap screws to engage.

While I have shown my novel power cylinder formed with two cup-shaped members of substantially the same size and configuration, with one of the members extruded from the vehicle firewall proper, it is contemplated that the concavity in the firewall may be made sufficiently deep so as to contain all of the booster operating mechanism. In this latter arrangement, the open end of the concavity would be closed by a suitably formed closure plate adapted for attachment to the marginal recessed portion 41 of the firewall which encircles said open end, and the master cylinder HC would be mounted on the outer (engine side) face of this closure plate to further decrease the overall length of the assembly projecting into the engine compartment to just the master cylinder only with the booster assembly projecting as a unit into the driver's compartment. Which of the two described power cylinders constructions that would be used would be determined by the type of power member, flexible diaphragm or solid piston, employed in the booster assembly and, limitations of installation space in the engine compartment of the vehicle.

The embodiment of my invention herein disclosed is believed well calculated to fulfill the objects above stated. It will be appreciated, however, that I do not wish such to be limited to the exact construction and/or arrangement of parts shown, since it is evident that modifications, variations, changes and substitutions may be made therein without departing from the proper scope or fair meaning of the subjoined claims.

Having thus described my invention, I claim:

1. In an automobile or the like having a firewall panel adapted to separate the driver's compartment from the engine compartment, and a pressure differential operated motor having a wall movable in a fluid chamber enclosure and dividing the latter into two opposing fluid pressure chambers associated with said firewall panel, the improvement which comprises: a cup-shaped depression integrally formed in a portion of said firewall panel to produce one of said fluid pressure chambers; a detachable cup-shaped shell having an outwardly flanged open end and a closed end to produce the other of said fluid pressure chambers; and means for attaching the flanged open end of said shell to said firewall panel in coaxial relationship to said depression to produce said fluid chamber enclosure.

2. In an automobile or the like having a firewall panel adapted to separate the driver's compartment from the engine compartment, and a pressure differential operated motor having a wall movable in a fliud chamber enclosure and dividing the latter into two opposing fluid pressure chambers associated with said firewall panel, the improvement which comprises: a cup-shaped depression integrally formed in a portion of said firewall panel with one end open and the other end closed to produce one of said fluid pressure chambers; a detachable cover member for closing the open end of said depression to produce the other of said fluid pressure chambers; and means for attaching said cover member to the firewall panel in coaxial relationship to said depression to produce said fluid chamber enclosure.

3. In an automobile or the like having a firewall panel adapted to separate the driver's compartment from the engine compartment, and a pressure differential operated motor having a wall movable in a fluid chamber enclosure and dividing the latter into two opposing fluid pressure chambers associated with said firewall panel, the improvement which comprises: a detachable cup-shaped shell having an open end defined by an outstanding flange provided with a plurality of spaced holes and a closed end, to produce one of said fluid pressure chambers; a complemental cup-shaped depression open at one end and closed at the other end and which is integrally formed in a portion of said firewall panel, to produce the other of said fluid pressure chambers, the open end of said depression being defined by a peripheral marginal portion of said firewall panel in which a corresponding number of holes is provided to register with the holes aforesaid in said flange; and a like-number of fasteners projecting through said registering holes, respectively, to secure said shell and firewall panel portion defining said depression, in a unitary coaxial assembly to produce said fluid chamber enclosure.

4. An automobile or the like constructed in accordance with claim 3 wherein the outer portion of said movable wall comprises a flexible ring-like member having its outer peripheral marginal portion positioned between said flange and said confronting marginal portion of said firewall panel, said outer marginal portion of said flexible member being provided with spaced holes in registry with the holes aforesaid in said flange and firewall panel to enable said fasteners to impinge said outer marginal portion of said flexible member between said shell and firewall panel.

5. An automobile or the like constructed in accordance with claim 3 wherein the aforesaid peripheral marginal portion defining the open end of said cup-shaped depression is annularly offset in the firewall panel, and reinforced on the driver's side thereof by a ring-like member having a like-number of threaded holes for engagement by complemental threads on said fasteners to rigidly clamp the shell and firewall panel in a unitary coaxial assembly to produce said fluid chamber enclosure 6. In an automobile or the like having a firewall panel adapted to separate the driver's compartment from the engine compartment, and a pressure differential operated brake booster motor having a pressure-responsive wall movable in a fluid chamber enclosure and dividing the latter into two opposing fluid pressure chambers associated with said firewall panel, the improvement which comprises: a cup-shaped depression integrally formed in a portion of said firewall panel with an open end defined by a circularly adjacent marginal portion of said panel and provided with a plurality of circumferentially spaced holes, and with a closed end therefor; a detachable cover member having an open end defined by an outstanding circular flange complemental to said circular marginal portion and provided with a corresponding plurality of spaced holes in registry with the holes aforesaid in said marginal portion of said panel, and a closed end therefor; a corresponding number of fasteners projecting through said registering holes, respectively, to connect the open ends of said cover member and depression in a unitary coaxial assembly to produce said fluid chamber enclosure; a flexible ring-like member defining the outer peripheral portion of said pressure-responsive wall with the peripheral marginal portion of the latter member being provided with a corresponding number of spaced holes and disposed between said cover flange and circular marginal portion on said firewall panel defining the open end of said depression, said latter holes registering with the registering holes aforesaid; an annular member positioned on the driver's side contiguously to said circular marginal portion and provided with a corresponding number of spaced threaded holes in registry with the aforesaid holes in the cover flange, flexible member and circular marginal portion on said firewall panel; and complementally threaded portions on said fasteners, respectively, adapted to engage said threaded holes in said annular member to rigidly clamp said cover flange, outer marginal portion of said flexible member and circular marginal portion on said firewall panel defining the open end of said depression, in a unitary coaxial assembly to produce said fluid pressure chambers on opposite sides, respectively, of said pressure-responsive wall.

7. In automobile structure and the like having a firewall panel adapted to support a pressure differential operated motor assembly having a pressure-responsive power member movable in a fluid chamber enclosure and dividing the latter into two fluid pressure chambers, the improvement which comprises: a pair of complemental hollow members having open confronting ends respectively, one of which members being formed in a portion of said firewall panel as an integral part thereof to produce one of said fluid pressure chambers, and the other of said members being attachable to the firewall panel in coaxial relationship to said one member with their open ends in confronting relationship to produce the other of said fluid pressure chambers; and means for attaching the open ends of said members in airtight sealed relation to produce said fluid chamber enclosure.

References Cited in the file of this patent
UNITED STATES PATENTS
2,685,170   Price _____ Aug. 3, 1954